March 6, 1973   B. SCOTT, JR   3,719,130
PHOTOGRAPHIC FILM MAGAZINE COMBINED WITH A CODED
MULTIPURPOSE FILM STRIP AND FOCUSING SCREEN
Filed Oct. 20, 1970   3 Sheets-Sheet 1

INVENTOR
BLANTON SCOTT, Jr.

BY *Shoemaker and Mattare*

ATTORNEYS

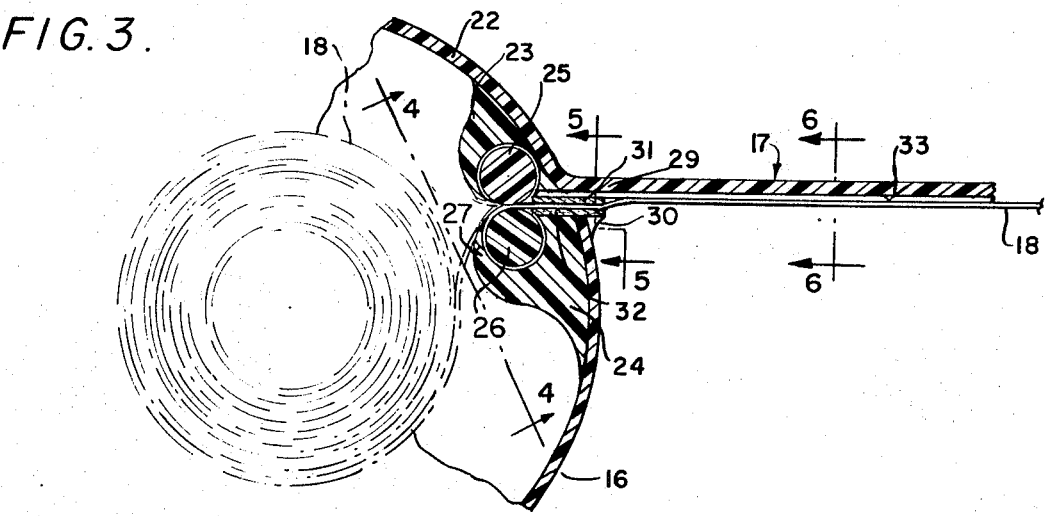
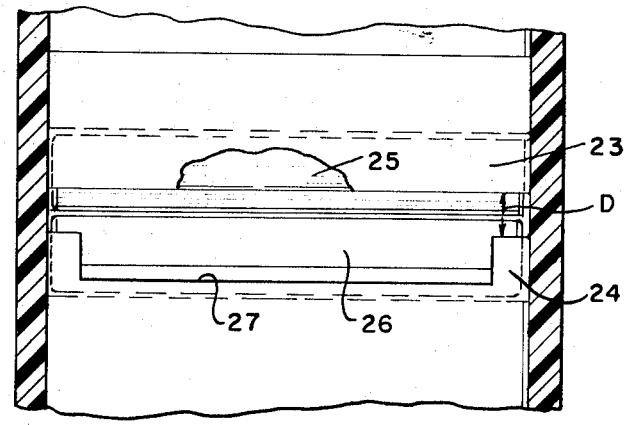
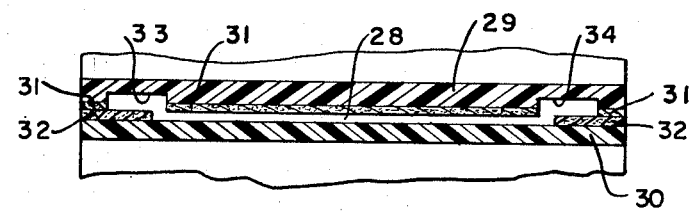
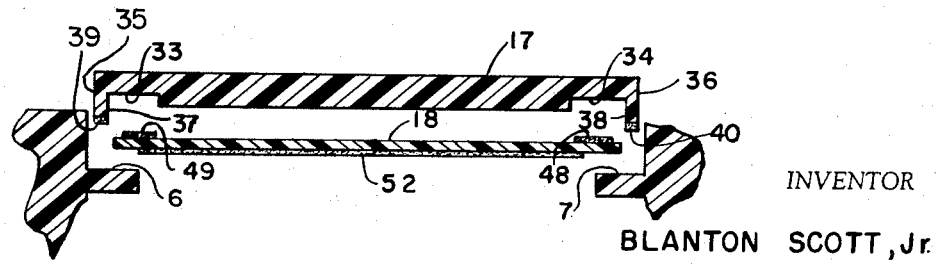

March 6, 1973 B. SCOTT, JR 3,719,130
PHOTOGRAPHIC FILM MAGAZINE COMBINED WITH A CODED
MULTIPURPOSE FILM STRIP AND FOCUSING SCREEN
Filed Oct. 20, 1970 3 Sheets-Sheet 3
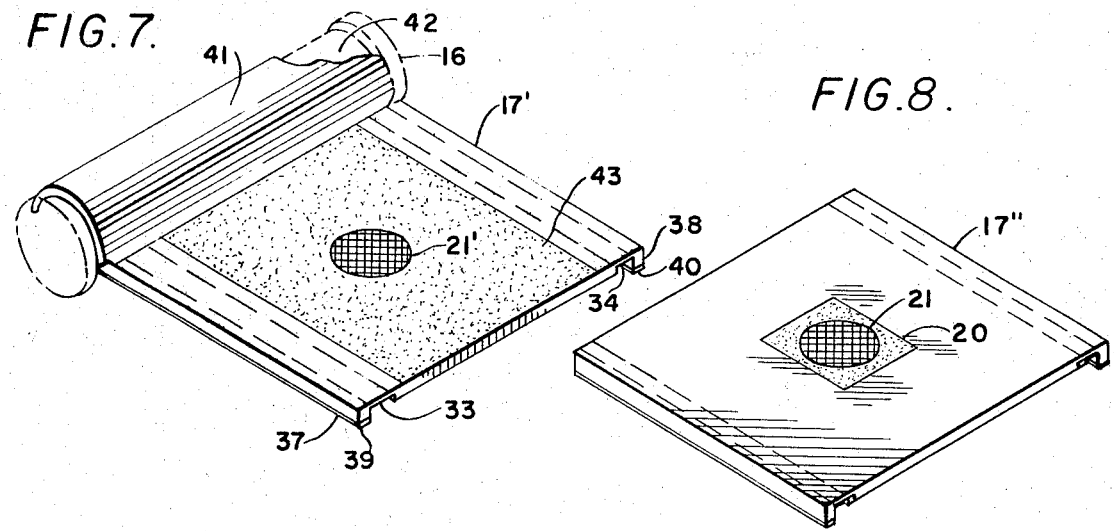
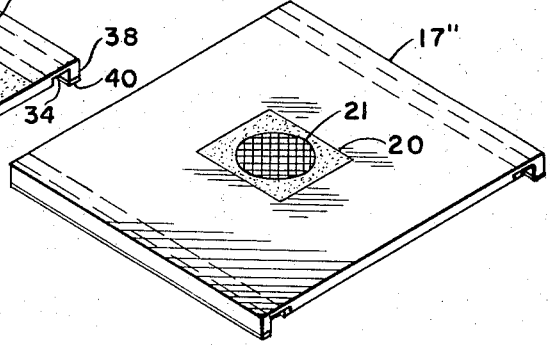
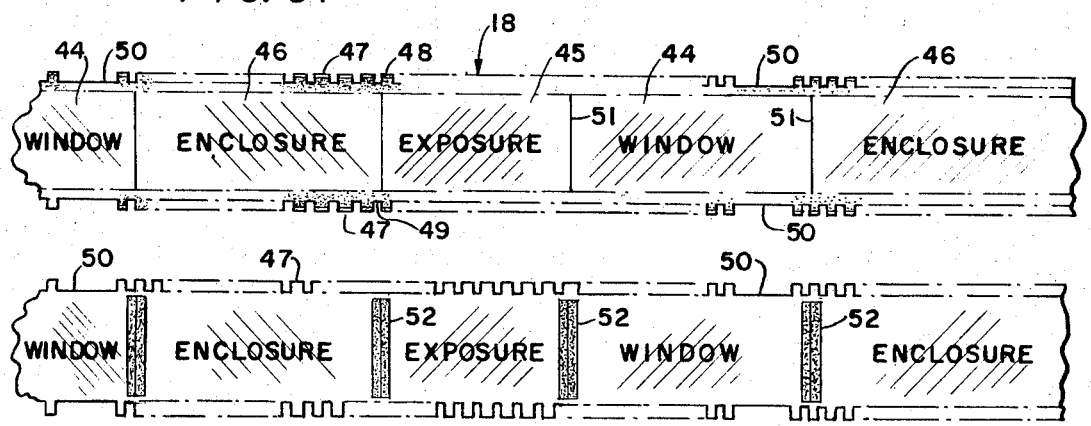
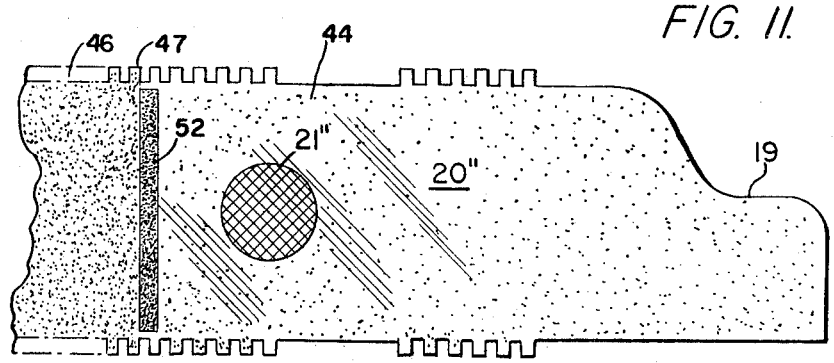
INVENTOR
BLANTON SCOTT, Jr.
BY *Shoemaker and Mattare*
ATTORNEYS

United States Patent Office 3,719,130
Patented Mar. 6, 1973

3,719,130
PHOTOGRAPHIC FILM MAGAZINE COMBINED WITH A CODED MULTIPURPOSE FILM STRIP AND FOCUSING SCREEN
Blanton Scott, Jr., 4250 E. Capitol St., Apt. 104, Washington, D.C. 20019
Filed Oct. 20, 1970, Ser. No. 82,301
Int. Cl. G03l 3/00
U.S. Cl. 95—44 R
44 Claims

ABSTRACT OF THE DISCLOSURE

Focusing apparatus for a camera having a lens, an image focal plane, and an openable back, to aid in focusing the camera for taking photographs, including an image-focus pressure plate having means thereon for resolving an image, and a film strip divided longitudinally into a plurality of divisions each including adhesive sealing means and a photosensitized exposure portion, a transparent window portion and an opaque enclosure portion. The film strip is adapted to be drawn from a spool or film magazine having adhesive clearance channel means across the image focal plane of the camera, and the image-focus pressure plate is adapted to overlie the film strip and image plane, so that with the camera back opened and a window portion of the film strip aligned with the image-focus pressure plate, an image projected through the camera lens can be focused on the image-focus pressure plate and visually observed to aid in focusing the camera, said enclosure portions and sealing means of the film shielding the photsensitized portions to prevent exposure thereof when the camera back is thus opened, and said image-focus pressure plate and film strip being constructed such that photographs can be taken with the image-focus pressure plate in position in the camera.

BACKGROUND OF THE INVENTION

Most roll film still cameras, particularly the thirty-five millimeter types, do not have a focal length of less than 3.3 or 3.5 feet. Naturally, an object cannot be photographed with such cameras at a closer distance than 3.3 or 3.5 feet without the use of attachments and various other aids, such as a close-up lens and the focal length conversion table for that particular lens. When a close-up lens is used, the focusing, bracketing, depth of field, and parallax problem becomes more difficult to solve, especially if the camera is not provided with a focusing screen. Therefore, if a built-in focusing screen is not provided, and a close-up lens is attached to the camera, a piece of frosted glass is sometimes used by the photographer to serve the purpose of focusing the camera for taking photographs at distances closer than 3.3 or 3.5 feet or at any other distance within the focal range of a camera which is supplemented with a "plus" or close-up lens. The procedure in using such an attachment generally is to open the back of the camera and place a piece of frosted glass over the image plane. Then, after the camera has been cocked and the shutter speed has been set to "B," the shutter release is depressed. This action causes the shutter to open, allowing the image to pass to the frosted glass, where it can be visually observed and focused, after which the shutter is caused to close by releasing the shutter release. However, this technique limits focusing to once per roll of film, and the focusing must be done before the film is loaded into the camera. If this technique is not used, and if the camera does not have a focusing screen, the in-focus distance must be accurately calculated or measured. This procedure has proven to be faulty, time consuming and in some cases, practically impossible to accomplish with any reasonable degree of accuracy.

The present invention overcomes these problems by providing a unique and novel combination of a multipurpose photographic film-strip and an associated multipurpose photographic film strip magazine and focusing plate. The magazine and focusing plate may be made disposable, if desired, and use of the invention will enable the user when using a supplementary "plus" or close-up lens to quickly and easily take photographs of objects closer than 3.3 or 3.5 feet or at any other distance within the focal range of a camera which has been supplemented with a "plus" or close-up lens without restricting the camera from being used to photograph objects at distances within the focusing range or ranges of its lens and without resorting to the time consuming, inaccurate and costly procedures heretofore followed. The present invention enables the user to photograph an object exactly as it appears on the focusing screen or plate of the magazine; and means are provided on the magazine and film-strip to shield the photosensitized portions of the film-strip from light when the camera back is open. This enables the user to make more than one (possibly seven or more) exposures on a single film-strip without having to remove the magazine and its associated film-strip from the camera during the sequence of focusing and/or exposing the film to image forming rays of light passing through the lens of the camera. This results in a substantial savings in time and cost involved in making photographs of objects closer than 3.3 or 3.5 feet or at any other distance within the focal range of a camera which is supplemented with a "plus" or close-up lens.

In conventional cameras, the magazine is made of a metallic material in a tube shape with a lipped opening, between the lips of which is provided a light absorbing material. The internal wall and other internal parts of the magazine are blackened so as to help protect the film-strip from light, and the caps that serve to close the ends of the magazine are also of a metallic material and are designed to help protect the film strip from light. The center of each cap is provided with a hole through which extends the ends of the spool gear. The spool, especially for thirty-five millimeter films, for example, is usually a cylindrical, molded synthetic device which has a flange near each end. Extending from each flange is an axle which is provided with a hole in the center. The axle ends protruding beyond the ends of the spool are usually unequal in length and recessed within the hollows of each end of the spool is a ratchet or clutch-like mechanism, each usually varying in shape and size. The clutch in one end of the spool has a prong extending a distance from the wall toward the center of the hollow of the spool. When the spool is in place within the camera, the spool ends are acted upon by a suitable mechanism when the advance lever or rewind knob of the camera is turned. This turning action forces the spool in the desired direction, causing the film to be coiled onto or uncoiled from the spool.

The associated film strip used with the abovedescribed conventional camera design is usually designed to provide enough area along the surface thereof for several exposures. For example, thirty-five millimeter film strips for still cameras are made available in two standard lengths, one length provides an area great enough for thirty-six exposures and the other for twenty exposures. Most thirty-five millimeter cameras which are designed to use this type film-strip are provided with a "film counter" which automatically indicates how many unexposed exposure areas are left on the film-strip.

The purpose of this invention is not to change or improve on the classical functions of conventional, single chamber type, film-strip magazines, but rather to incorporate into the existing function and structure of such conventional devices, additional and unique and novel advantages and conveniences. Therefore, although the mechanical principles of operation of the spool and the design of the enclosure caps, in particular, may vary from manufacturer to manufacturer for these devices, this invention can be easily incorporated into the design of practically any existing single chamber, film-strip magazine, as can be seen by those skilled in the art.

In addition, it should be remembered that the incorporation of this invention into a camera will not restrict the user to taking only close-up pictures with the camera. The camera may still be used to photograph pictures within its focusing range without removing said invention from the camera. However, when this invention is in a camera and is not needed for taking a picture, Steps 10, 11, 12 and 13 outlined hereinafter in the procedures for using this invention must be followed because of the advance stop slots in the film. These procedures must be followed each time the film strip has been advanced to where the camera sprocket member comes into registry with slots.

OBJECTS OF THE INVENTION

It is an object of this invention to provide means for use in conventional roll-film still cameras for enabling photographs to be made of objects closer than the standard focal length of the camera when a supplementary "plus" or close-up lens is used.

Another object of this invention is to provide a unique and novel image-focus pressure plate for use in roll-film still cameras whereby an image may be visually observed on the plate and the camera accurately focused for taking photographs of objects closer than the standard focal length of the camera which is supplemented with a "plus" or close-up lens.

Yet another object is to provide a unique and novel film magazine having means therein for reducing the friction on a film strip as it is withdrawn from and rewound into the magazine.

A still further object is to provide a unique and novel coded, multipurpose film strip for use in roll-film still cameras wherein means is provided on the film strip for sealing the film strip against light from entering the spool or take-up spool when the camera back is opened and means is provided for automatically indicating when the film strip has been advanced in the camera to a desired position.

An even further object is to provide a combination film magazine, image-focus pressure plate and coded, multipurpose film strip as above, all adapted to be used together for visually focusing an object before taking a photograph of the object at any distance within the focusing range or ranges of a roll-film still camera being used with or without a supplementary "plus" or close-in lens.

BRIEF DESCRIPTION OF THE DRAWINGS

FIG. 3 is a view in section of a portion of the magazine according to the present invention showing the rollers and exit lips.

FIG. 4 is a rear view of the rollers in the magazine taken along the line 4—4 in FIG. 3.

FIG. 5 is a sectional view of the lips on the magazine taken along the line 5—5 in FIG. 3.

FIG. 6 is an exploded sectional view of the camera image plane tracks, film strip and focus plate taken along the line 6—6 in FIG. 3.

FIG. 7 is a top perspective view of a modified form of the invention showing a separate focus plate positioned on a magazine.

FIG. 8 is a top perspective view of a still further modification of a focusing plate according to the present invention.

FIG. 9 is a top plan view of a film strip according to the present invention.

FIG. 10 is a bottom view of the film strip shown in FIG. 9.

FIG. 11 is an enlarged view of an end portion of a film strip according to the present invention showing the manner in which it is tapered for application to the take-up spool of a thirty-five millimeter camera.

DETAILED DESCRIPTION OF THE INVENTION

Figure 1:
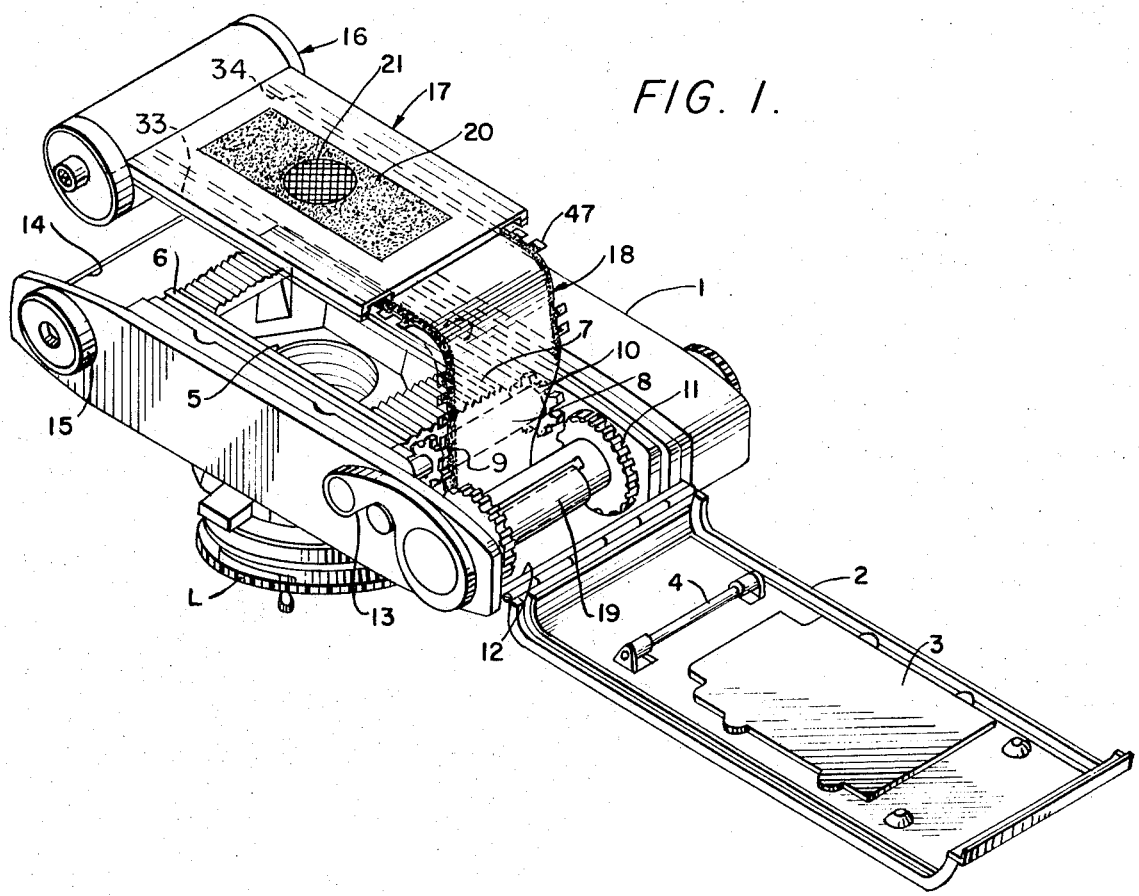
FIG. 1 is an exploded perspective view of a conventional thirty-five millimeter camera with the back open and showing the magazine, focusing plate and film strip according to the present invention removed therefrom.

Referring now to the drawings wherein like reference numerals refer to like parts throughout the several views, a conventional thirty-five millimeter camera is illustrated at 1 in FIG. 1. The camera has a hinged back 2 shown open in FIG. 1 exposing the inside of the back of the camera. The back 2 has a conventional pressure plate 3 and pressure bar 4 thereon for cooperating with the film strip as it is advanced from the magazine to the take-up spool. An opening 5 is disposed generally centrally in the back of the camera and comprises the image plane therefor. A pair of film guides or tracks at opposite sides of the image plane 5 are indicated at 6 and 7, respectively, and are commonly referred to as image plane tracks. These tracks extend longitudinally along opposite sides of the image plane 5 and terminate short of the ends of the camera. A conventional sprocket member 8 having two sprocket wheels 9 and 10 thereon is rotatably mounted in the right hand end of the camera as viewed in FIG. 1 adjacent the ends of the image plane tracks 6 and 7, and a film take-up spool 11 is disposed within a recess 12 in the right hand end of the camera adjacent the sprocket member 8. A film advance lever 13 is disposed on the outside of the camera operatively connected with the take-up spool 11 for causing the film to be advanced across the back of the camera and wound on the take-up spool 11. At the opposite or left hand end of the camera, as viewed in FIG. 1, a recess 14 is formed for receiving a roll of film therein and a rewind knob 15 is on the outside of the camera at one end of the recess 14 and includes means (not shown) for cooperating with a spool of film disposed in recess 14 for rewinding the film upon the spool. A supplemental lens is shown at $L_1$ for attachment to the lens L for taking close-up photographs.

All of the aforedescribed structure is conventional and forms no part of the present invention but has been described in order that the invention may be more fully understood.

Still referring to FIG. 1, a magazine 16, image-focus, pressure plate 17 and film strip 18 according to the present invention are shown removed from the back of the camera 1. One end 19 of the film strip is partially wound upon the film take-up spool 11. The central portion of the image focus and film pressure plate 17 is frosted as indicated at 20 in order that an image passing through the lens L of the camera will be resolved thereon for visual observance by a person using the camera. If desired, the image-focus and film pressure plate 17 may also include a microprism area 21 located within the frosted area 20 for obtaining a sharper image on the plate 17. Further, in some cameras, the image plane 5 may be offset to one side or the other from center or may be longer in some cameras and accordingly, the frosted area 20 may be made longer than the image plane, as shown.

Referring now more particularly to FIGS. 3, 4, 5 and 6, further details of the film magazine 16 and image-focus and film pressure plate 17 may be seen. The magazine 16 comprises an elongate hollow tubular casing 22 with an upper roller bearing housing or retainer 23 and a lower roller bearing housing or retainer 24 formed on the inside surface thereof. The roller bearing housings 23 and 24 are generally arcuately shaped and are spaced apart a distance D for unobstructed passage of film 18 therethrough as it is unwound from the spool. A pair of roller bearings 25 and 26 are housed within the roller bearing housings 23 and 24 and are preferably coated with a friction reducing material such as Teflon or the like. The roller bearings 25 and 26 serve to guide the film 18 through the wall of the magazine 16 with a minimum amount of friction as the film is pulled from the magazine. The lower roller bearing housing 24 includes an adhesive clearance channel 27 therein extending substantially the entire length of the housing 24 and of a sufficient depth and width to enable the film strip 18 to pass unobstructedly therethrough. The film 18 exits from the magazine 16 through an opening 28 (FIG. 5) between upper and lower lips 29 and 30, respectively, on which is provided a suitable light absorbing material such as a fibrous material or the like 31 and 32, respectively, preferably black or blackened. The function of the light absorbing material 31 and 32 is to help prevent light from entering the magazine 16 and exposing film contained therein, and the opposite edges of the film strip are received between the light absorbing material 31 and 32 as the film is drawn through opening 28.

As seen in FIGS. 1 and 3, the upper lip 29 is extended to form the image-focus and pressure plate 17 which is of sufficient length to extend the entire length of the image plane tracks 6 and 7 and is of sufficient width to overlie the image plane and image plane tracks 6 and 7. The upper lip 29 and its extension forming the image focus and pressure plate 17 have adhesive clearance channels 33 and 34 extending longitudinally adjacent opposite edges thereof for a purpose more fully explained hereinafter. Also, as seen in FIG. 5, the light absorbing material 32 on the bottom lip 30 is interrupted or omitted in a central portion thereof for a purpose more fully explained hereinafter.

The image-focus and pressure plate 17 is preferably formed of a transparent plastic material and the frosted area 20 and micro-prism area 21 are preferably disposed on the underside of the plate. As best seen in FIG. 6, the opposite edges 35 and 36 of the plate 17 are extended downwardly beyond the plane of the bottom surface of the plate and define longitudinally extending shoulders or supports 37 and 38 which are adapted to rest on the image plane tracks 6 and 7 when the plate is positioned thereon. The bottom surface of the shoulders 37 and 38 are covered, respectively, with a suitable pressure sensitive, non-drying adhesive 39 and 40 for ensuring that the plate will remain securely in position over the image plane when it is positioned in the camera. The shoulders 37 and 38 serve to space the plate 17 sufficiently above the image plane to enable the film 18 to be pulled across the image plane without being obstructed or clamped against movement by the image-focus and pressure plate 17.

Referring to FIG. 7, a modified form of image-focus and pressure plate 17' is illustrated wherein the plate 17' is formed separately from the magazine 16 and includes an arcuate upwardly curved lip or extension 41 which is adapted to be disposed in a shallow recess 42 formed in the magazine 16 when the plate 17' is operatively positioned in the camera. The entire surface of the plate 17' is frosted as indicated at 43 and the central portion thereof includes a micro-prism area 21' for obtaining a sharper resolution of an image projected onto the pressure plate from lens L. The modified image-focus and pressure plate 17' is otherwise substantially identical with the plate 17 in that it includes a pair of adhesive clearance channels 33 and 34 extended along opposite edges thereof and longitudinally extending support shoulders 37 and 38 at opposite edges thereof with adhesive 39 and 40 along the bottom surface of the support shoulders. The extension or lip 41 serves to accurately position and locate the image-focus and pressure plate 17' in position relative to the image plane. The plate 17' may be formed of a suitable transparent material such as plastic or glass or the like.

In FIG. 8 a still further form of image-focus and pressure plate 17" is illustrated and is formed simply as a flat rectangular sheet of transparent material such as plastic or glass or the like which is adapted to abut against the upper lip of the magazine 16 when it is placed in the back of the camera over the image plane. The central portion of the plate 17" includes a frosted area 20 and micro-prism area 21 identical to the frosted area and micro-prism area in the image-focus and pressure plate 17 illustrated in FIG. 1. Plate 17" is otherwise identical in construction to plate 17.

Referring now to FIGS. 9, 10 and 11, the coded multi-purpose film strip 18 according to the preesnt invention is illustrated. The film strip comprises a series of divisions arranged along the length of the film strip, each division comprising a window portion 44, exposure portion 45 and an enclosure portion 46 in the order as given with the exception of the first division on the film strip which has two enclosure portions located on opposite sides of an exposure portion as follows: window portion, enclosure portion, exposure portion and enclosure portion. The first enclosure of the first division is provided to help prevent light from entering the spool and exposing the film therein. The window portions 44 of the film strip are transparent and permit the image forming rays of light from the subject to pass through it to the image-focus pressure plate 17. Each window portion 44 is great enough in length to extend the length of the back of the image plane and wide enough to rest on the edge of the tracks of the image plane. The window portion is narrow enough, however, so as not to come into contact with the adhesive portions 39 and 40 of the image-focus pressure plate 17. The first window portion of the first division of the film strip is greater in length than the length of the window portions that follow so as to provide enough length for the end of the film strip to be tapered for winding upon the take-up spool 11. The opposite edges of the film strip are provided with symmetrical square teeth 47 thereon for cooperation with the sprocket wheel 8 for enabling the film to be wound upon the take-up spool 11. Narrow strips of pressure sensitive, preferably blackened adhesive 48 and 49 are provided along opposite edges of the top suraces of the film strip for sealing the film strip as it is wound upon the take-up spool to help prevent light from entering between the layers of film wound on the spool and damaging or exposing the image recorded on the exposure areas of the film. The bands or strips of adhesive 48 and 49 terminate short of the ends of the teeth 47 so that the opposite edges of the film strip will not stick or adhere to parts of the camera or magazine and image-focus pressure plate if the film becomes slightly misaligned as it passes across the back of the camera. At the beginning of each window portion, a predetermined number of teeth 47 are omitted providing advance stop slots 50 for automatically indexing or indicating when the film has been advanced to a point where a window portion overlies the image plane 5. Each slot 50 is great enough in length and depth so as to cause the teeth or sprockets of the camera film take-up spool not to make contact with the film strip teeth to create a forward motion in the film strip when the film advance lever is actuated. Additionally, laterally extending lines 51 are provided on the top surface of the film strip to indicate the location of each portion of each division. These indicating lines are optional and may be used in conjunction with the advance-stop slots or omitted, as desired.

The exposure portions 45 of the film strip are photosensitized to record the image of the object they are exposed to. Each exposure portion of the film strip is great enough in length to extend the length of the back of the image plane and wide enough to rest on the tracks of the image plane but narrow enough not to come in contact with the adhesive portions of the image-focus pressure plate. The exposure portions could be great enough in length to record more than one photograph thereon, if desired. These exposure portions 45 are coated on the underside with a photosensitized chemical composition that serves to record the images they are exposed to.

The enclosure portions 46 are opaque and serve to protect the photosensitized portions of the film strip from light while the exposure portions are enclosed within the enclosure portions. This protection is provided both before and after the exposure portions have been exposed to the image of the object. Each enclosure portion 46 is great enough in length and width to enclose the exposure portion next to it and wide enough to rest on the image plane tracks but narrow enough not to come in contact with the adhesived portions on the bottom of the image-focus pressure plate. An enclosure portion 46 follows each exposure portion 45 of the film strip and the enclosure portions are preferably black or blackened.

The underside of the film strip has a plurality of narrow bands of adhesive 52 extending laterally of the film strip and terminating short of the ends of the teeth 47. The bands of adhesive 52 are disposed at the end boundary of each portion of each division of the film strip and serve to seal the film strip from light as the strip is wound upon the take-up spool. The strips of adhesive 48 and 49 and 52 effectively seal the film strip against admission of light thereto whether the strip is wound upon the take-up spool in a clockwise direction or in a counter clockwise direction.

The camera is provided with a mechanical film counter 53 (FIG. 2) which serves as a means to determine when each portion of each division of the film has been advanced in position over the back of the focal plane of the camera. For example, No. 36 on the film counter of a thirty-five millimeter camera serves to correspond to and to indicate that the first window of the first division is in position over the focal plane; No. 34 on the film counter indicates that the first enclosure of the first division is in position over the focal plane; and No. 32 on the film counter indicates that the first exposure of the first division is in position over the focal plane, etc.

Accordingly, in accordance with one embodiment, a film strip approximately 1,550 millimeters long provides enough area for eight window portions in lengths of approximately 50 millimeters each, eight exposure portions in lengths of approximately 90 millimeters each and nine enclosure portions in lengths of approximately 50 millimeters each. The enclosure portions, although not as great in length as the exposure portions in this example, are sufficiently long to cover and shield the exposure portion in either the magazine or on the take-up spool, because when an exposure portion is wound onto the take-up spool, a following enclosure portion has sufficient length to wrap around and cover at least that portion of the exposure portion which would be exposed to light with the camera back open. The same is true as the film leaves the film magazine. Further, adhesive sealing means is provided at spaced intervals on the film strip and this adhesive means effects a seal between adjacent layers of the film as it is wound onto a spool to exclude light from entering between the layers and thus exposing the photosensitized portions of the film. It is to be understood that the above dimensions are for application to thirty-five millimeter cameras, but the dimensions could be varied to correspond to the requirements of different types of cameras.

The above dimensions are not to be considered limiting, the important point being that the exposure portions should each be large enough to overlie the camera image plane and the enclosure portions should each be large enough to seal the exposure portions from light when the film strip is wound onto a spool. The exposure portions could even be smaller than the enclosure portions, as shown in FIGS. 9 and 10, for example.

As the film is advanced from the magazine 16 to the take-up spool 11 across the image plane 5, the strips of adhesive 48 and 49 on the top surface of the film strip are disposed in registry with the adhesive clearance channels 33 and 34 on the upper lip 29 and image-focus pressure plate 17. The adhesive clearance channels 33 and 34 are slightly greater in width than the width of the bands of adhesive 48 and 49 so that there is no danger of the adhesive channels of the adhesive bands 48 and 49 adhering to the image-focus pressure plate 17 as the film is advanced therepast.

The transverse bands of adhesive 52 on the undersurface of the film strip are not as great in extent as the width of the image plane 5 and accordingly, these bands of adhesive do not adhere to portions of the camera as the film is advanced across the image plane. As noted previously, the adhesive clearance channel 27 in the lower roller bearing housing 24 has a sufficient depth and width so that the bands of adhesive 52 do not contact the lower roller bearing housing 24 as the film is unwound from the spool.

As seen in FIG. 11, the window portions of the film strip may be provided with a frosted area 20'' and/or micro-prismed area 21'' and the frosting or micro-prism on the image-focus pressure plate 17 could then be eliminated if desired since the image would be resolved upon the film strip itself for observance by the photographer to enable the camera to be focused.

The procedure in using the present invention is substantially as follows, with respect particularly to a thirty-five millimeter camera:

(1) Attach the close-up lens $L_1$ (if desired or necessary where the camera does not have one) and load the magazine 16 into the camera according to the instructions supplied with the camera, being careful not to permit the adhesived undersurfaces 39 and 40 of the image-focus pressure plate to adhere to the image plane tracks 6 and 7.

(2) Raise the image-focus pressure plate 17 slightly above the image plane 5.

(3) Pull the tapered end 19 of the film strip 18 toward the take-up spool 11 and thread the end 19 into the spool.

(4) Turn the take-up spool 11 with the thumb just enough to ensure that the film strip will not slip out of the take-up spool.

(5) Gently press the image-focus pressure plate 17 in place over the image plane with the adhesived shoulders 39 and 40 in engagement with the image plane tracks 6 and 7.

(6) Advance the film strip by turning the take-up spool with the thumb until the film strip stops at the advance stop slot 50 which will occur automatically when the sprocket teeth on the sprocket member 8 come into registry with the slots 50.

Figure 2:
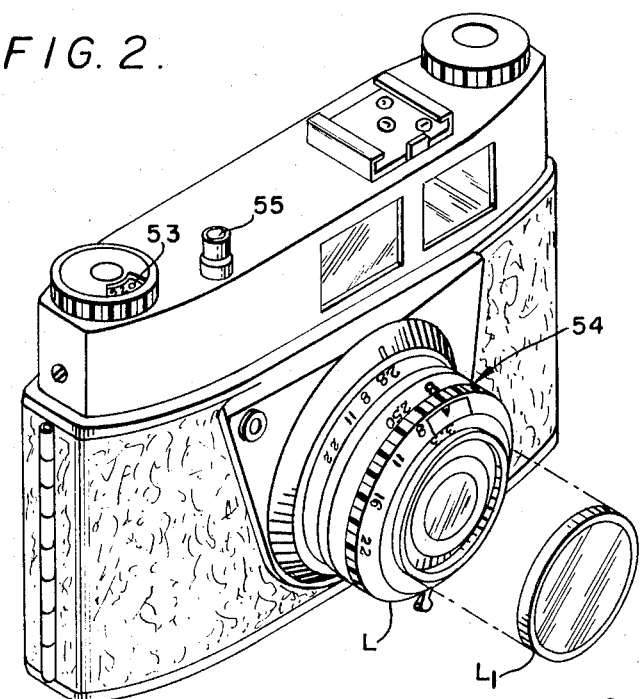
FIG. 2 is a front perspective view of a conventional thirty-five millimeter camera showing the lens setting for taking pictures at 3.3 feet or closer if a supplementary "plus" or close-up lens is used.

(7) Set the shutter to "B" as indicated at 54 in FIG. 2, and set the "F" stop to a position which results in the brightest image on the image plate. This "F" stop number may or may not correspond to the proper setting for taking the photograph.

(8) Set the film counter 53 to the required number, i.e. 36, 34, 32 or the like.

(9) Observe the image on the frosted area of the film or image-focus pressure plate, as the case may be, by completely depressing and holding the shutter release down until the subject has been focused by properly adjusting the camera.

(10) Advance the film strip by turning the film strip take-up spool with the thumb until just a few of the teeth 47 on the film are engaged with the sprockets on the sprocket member 8.

(11) Close the camera back.

(12) Hold the finger on the shutter release 55 and advance the film strip with the advance lever 13 for the required number of turns making sure that the shutter release 55 is not depressed when the last turn is made. This last turn cocks the camera and advances an exposure portion 45 of the film strip in position over the image plane 5.

(13) Take the picture by depressing the shutter release, and if all other conditions such as lighting, etc. have been made, an accurately focused picture will be made.

(14) Advance the film strip to the next window portion with the advance lever 13, the advance lever being manipulated until the teeth of the film strip and the sprockets of the take-up spool are disengaged or in other words, until the sprockets of the take-up spool come into registry with a slot 50. When this occurs, a window portion of the film strip will be in position over the image plane.

(15) Repeat steps 7, 9, 10, 11, 12 and 13 above.

The magazine 16 may be made of a suitable plastic material, if desired, and may be manufactured economically enough so as to be disposed of after use at even less cost then conventional film magazines.

The image-focus pressure plate 17, being integral with the magazine 16 may also be made of a plastic material and disposed of along with the magazine, if desired. The image-focus pressure plates 17' and 17'', inasmuch as they are separate from the magazine 16, may be made of any suitable transparent material, such as plastic or glass or the like and may be disposed of or retained after use, as desired.

The film strip 18 may be preferably made of conventional materials, such as cellulose ester or the like and when the strip is placed in the magazine 16, the end 19 of the film strip may be caused to extend just through exit slot 28 or it may be extended the length of the image-focus pressure plate 17 and suitably fastened thereto for ease in handling.

It will be apparent to those skilled in the art that while the invention has been described in relation particularly to a thirty-five millimeter camera, it is equally applicable to most any roll-film still cameras. Moreover, the specific procedure set for using the invention is merely a suggested procedure and is not to be considered limiting on applicant's invention.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

I claim:

1. Focusing apparatus for a camera having a lens, an image focal plane, and an openable back, to aid in focusing the camera for taking photographs, comprising a film strip adapted to be extended across the image focal plane of the camera, said film strip divided longitudinally into a plurality of divisions each including a photosensitized exposure portion, a transparent window portion and an opaque enclosure portion, each enclosure portion having sufficient width and length to shield from light an adjacent exposure portion wound on a spool, spaced adhesive sealing means on the film strip to seal adjacent layers of film wound on a spool and thus shield the film wound on the spool from light when the camera back is opened, and an image-focus pressure plate adapted to be positioned in the camera substantially in the plane of the image focal plane and in overlying, spanning relationship to said image focal plane and the film strip extended thereacross, said film strip being movable across the image focal plane of the camera to bring a transparent window portion thereof into alignment with said image-focus pressure plate so that an image focused by the lens of the camera can be projected through the film strip and onto the image-focus pressure plate, said image-focus pressure plate having means thereon to resolve an image projected thereon through the camera lens so that the image may be visually observed when the camera back is opened to enable the camera to be accurately focused, said enclosure portions of said film strip and said adhesive sealing means enabling said camera back to be opened and said camera to be focused without exposing the exposure portions of the film, and said film strip and image-focus pressure plate enabling photographs to be taken while the image-focus pressure plate is in position in the camera.

2. Focusing apparatus as in claim 1, wherein said image-focus pressure plate is transparent and the means for resolving an image comprises a frosted area on the undersurface of said image-focus pressure plate.

3. Focusing apparatus as in claim 1 wherein said image-focus pressure plate is transparent and is formed integrally with a film magazine from which said film is withdrawn, said film extending from a film exit slot in said magazine, said image-focus pressure plate comprising an upper lip over the film exit slot and extending from the magazine in a direction to overlie the image focal plane of a camera when the magazine and image-focus pressure plate are positioned in a camera.

4. Focusing apparatus as in claim 3 wherein said magazine and plate are made of a suitable plastic material.

5. Focusing apparatus as in claim 3 wherein said image-focus pressure plate has elongate shoulder means along opposite edges of the plate extending vertically downwardly from the plate and substantially coextensive in length with the plate.

6. Focusing apparatus as in claim 5 wherein a pressure sensitive, non-drying adhesive is on the bottom surface of each shoulder means for securing the image-focus pressure plate in position in the back of a camera with the shoulder means engaged on image plane tracks extending along opposite sides of the image plane of the camera.

7. Focusing apparatus as in claim 6 wherein the adhesive sealing means on said film strip comprises longitudinally extending narrow bands of adhesive along opposite edges thereof, and said image-focus pressure plate has adhesive clearance channels in the undersurface thereof along its opposite edges of a greater width dimension than the width of the bands of adhesive on the film strip and adapted to be in registry with the bands of adhesive on said film strip when said magazine, image-focus pressure plate and film strip are positioned in the back of a camera so that the bands of adhesive on the film strip will not adhere to the image-focus pressure plate.

8. Focusing apparatus as in claim 7 wherein said magazine includes upper and lower roller bearing means disposed internally of said magazine above and below the film exit slot, respectively, to reduce the friction on said film strip as it is moved through said film exit slot.

9. Focusing apparatus as in claim 8 wherein said film strip includes a plurality of laterally extending narrow bands of adhesive on the underside thereof at the ends of each of said portions, and said lower roller bearing means in said magazine has a bearing retainer housing with an adhesive clearance channel therein so that the laterally extending bands of adhesive on the underside of said film strip do not adhere to said roller bearing housing as said film is moved through said film exit slot.

10. Focusing apparatus as in claim 1 wherein said image-focus pressure plate includes an upwardly directed arcuate lip or extension which is adapted to be received in a complementary recess in a film magazine when said magazine and image-focus pressure plate are positioned in a camera so that said image-focus pressure plate is accurately positioned relative to said image focal plane.

11. Focusing apparatus as in claim 1 wherein said image-focus pressure plate comprises a substantially flat rectangular sheet of transparent material having a means thereon adapted to abut against a film magazine immediately above a film exit slot in said magazine when said magazine and plate are positioned in a camera.

12. Focusing apparatus as in claim 1 wherein said film strip includes a plurality of symmetrical square teeth along opposite edges thereof adapted to cooperate with a sprocket member in said camera so that said film may be caused to advance across the image focal plane in said camera.

13. Focusing apparatus as in claim 12, wherein the teeth are omitted at the beginning of each window portion on opposite edges thereof to define an indexing slot so that said film is automatically stopped in its advancement when the sprocket member in said camera is in registry with said slot.

14. A photographic film strip magazine comprising an elongate cylinder having a hollow interior for receiving therein a roll of film having spaced adhesive sealing means thereon to seal the film against exposure to light when the film is wound on a spool, an elongate relatively narrow film exit slot in one side of said magazine through which an end of the film is adapted to extend for withdrawal from said magazine, and bearing means in said magazine adjacent said film exit slot for reducing the friction on said film as it is withdrawn from said magazine through said slot, said bearing means having adhesive clearance channel means therein for unimpeded passage of the film strip therepast when the film strip is withdrawn from the magazine.

15. A photographic film strip magazine as in claim 14 wherein lip means are provided above and below said film exit slot on the exterior of said magazine and light absorbing material is secured on said lip means in said exit slot for sealing said exit slot against admission of light therethrough to the interior of the magazine, said bearing means comprising upper and lower roller bearing means immediately above and below said slot.

16. A photographic film strip magazine as in claim 15 wherein the upper lip on said magazine is extended outwardly from said magazine to define an elongate substantially flat rectangular image-focus pressure plate, said image-focus pressure plate being transparent and having means thereon for resolving an image projected thereonto by the lens of the camera.

17. A photographic film strip magazine as in claim 16 wherein said means for resolving an image comprises a frosted area on said image-focus pressure plate, and a micro-prism area is formed within said frosted area for obtaining a sharper image.

18. A photographic film strip magazine as in claim 15, wherein adhesive clearance channel means are on said lip means and said light absorbent material so that the film strip can be moved therepast without interference between the adhesive on the film strip and the lip means or light absorbent material.

19. A photographic film strip magazine as in claim 16, wherein adhesive clearance channel means are on said plate for unimpeded movement therepast of the film strip and the adhesive seal means thereon.

20. An image-focus pressure plate to aid in focusing a camera having an openable back, an image focal plane and a lens, comprising a relatively flat substantially rectangular transparent plate having means thereon for resolving an image projected onto said plate through the lens of the camera when said image-focus pressure plate is disposed in the back of a camera, said plate adapted to overlie said focal plane and a film strip in said camera, said film strip divided longitudinally into a plurality of divisions each including a transparent window portion, a photosensitized exposure portion, and an opaque enclosure portion and having adhesive sealing means thereon to seal adjacent layers of film wound on a spool against exposure to light, said window portions being alignable with said plate to enable light projected through said lens to focus on said plate, said means on said plate for resolving an image thereon enabling a person using said camera to visually observe the image projected onto said plate when the camera back is opened so that the camera may be accurately focused for taking photographs.

21. An image-focus pressure plate as in claim 20 wherein said image-focus pressure plate is formed of a plastic material and said means for resolving an image comprises a frosted area on said plate.

22. An image-focus pressure plate as in claim 21 wherein said frosted area is on the undersurface of said plate.

23. An image-focus pressure plate as in claim 22 wherein said image-focus pressure plate is formed integrally with a film magazine and comprises an upper lip on said film magazine disposed above a film exit slot in one side of the magazine and extending outwardly from the magazine in a manner to overlie the image plane of a camera when the magazine and image-focus pressure plate are disposed in the back thereof.

24. An image-focus pressure plate as in claim 23 wherein a vertically downwardly extending shoulder is on each of the opposite edges of said plate substantially commensurate in length with said plate, said shoulders adapted to rest upon a respective image plane track on opposite sides of an image plane in a camera when said plate is positioned in said camera.

25. An image-focus pressure plate as in claim 24 wherein an adhesive material is on the bottom surface of each said shoulder for securing said image-focus pressure plate relative to said image plane tracks when said plate is disposed on said tracks.

26. An image-focus pressure plate as in claim 25 wherein said adhesive comprises a pressure sensitive, non-drying adhesive material.

27. An image-focus pressure plate as in claim 26 wherein an elongate adhesive clearance channel is formed along each edge of said plate adjacent to said shoulders, said adhesive clearance channels adapted to be in registry with a narrow band of adhesive on opposite edges of a film strip to be used with said plate.

28. An image-focus pressure plate as in claim 20 wherein said image-focus pressure plate has an upwardly directed arcuate lip or extension on one end thereof adapted to be received in a complementary recess in a film magazine for accurately positioning the image-focus pressure plate over an image plane of a camera when said image-focus pressure plate and magazine are positioned in said camera.

29. A coded multipurpose photographic film strip for use in roll-film still cameras, said film strip divided longitudinally into a series of divisions, each division including a transparent window portion, an opaque enclosure portion, and a photosensitized exposure portion, and spaced adhesive sealing means on said film strip to seal adjacent layers of film wound on a spool to prohibit exposure of the photosensitized portions, each enclosure portion having a width and length sufficient to shield from light an adjacent exposure portion wound on a spool.

30. A film strip as in claim 29, wherein said film strip includes means theron for automatically indexing said film strip to predetermined longitudinal positions in a camera in which said film strip is positioned.

31. A film strip as in claim 30 wherein said means includes symmetrical square teeth along opposite edges of said film strip for cooperation with a toothed sprocket wheel in a camera in which said film strip is placed, said teeth being interrupted or omitted at predetermined positions along said film strip to define advance-stop slots in said teeth which are adapted to come into registry with the sprocket member for automatically stopping the advancement of said film in said camera.

32. A film strip as in claim 31 wherein said advance-stop slots are at the beginning of each window portion of said film strip.

33. A film strip as in claim 29 wherein the window portions of said film strip include means thereon for resolving an image projected onto said film strip through the lens of a camera in which said film strip is positioned so that the image may be visually observed and the camera accurately focused for taking photographs of objects closer than the standard focal length of said camera when said camera is provided with a supplemental "plus" or close-up lens.

34. A film strip as in claim 29, wherein said adhesive sealing means includes a narrow band of adhesive on the top surface of said film strip along each of the opposite edges thereof for sealing said film strip against exposure to light when said film strip is wound upon a spool.

35. A film strip as in claim 34 wherein a plurality of laterally extending narrow bands of adhesive are on the undersurface of said film strip, with a band of adhesive positioned at the ends of each of said portions for sealing said film strip against exposure to light when said film strip is wound upon a spool.

36. A film strip as in claim 35 wherein said bands of adhesive terminate short of the edges of said film strip to prevent said adhesive from adhering to portions of a camera in which said film strip is used.

37. A film strip as in claim 36 wherein the first division of said film strip comprises a window portion, an enclosure portion, an exposure portion and an enclosure portion in that order, the first enclosure of the first division serving to prevent light from entering a spool and exposing the film when said film is wound upon said spool.

38. A film strip as in claim 37, wherein the first portion of the first division is a window portion.

39. A film strip as in claim 37 wherein the first portion of the first division is an enclosure portion.

40. A combination photographic film strip magazine and image-focus pressure plate for use in a camera, comprising a hollow elongate magazine having means for receiving therein a roll of photographic film having spaced adhesive sealing means thereon for sealing adjacent layers of the film from exposure to light when the film is wound on a spool, film exit slot means in said magazine through which one end of a roll of film received therein is adapted to be extended to withdraw the film from said magazine, a relatively flat rectangular transparent plate extending laterally from said magazine, one end of said rectangular plate being positioned adjacent said means through which said film is withdrawn, said flat rectangular plate adapted to overlie an image focal plane of a camera when said plate is positioned in a camera, means on said plate for resolving an image thereon from rays of light passing through a lens of the camera and striking said plate, at least said plate having adhesive clearance channel means thereon to enable said film strip having adhesive sealing means thereon to move therepast without adhering thereto.

41. The combination as in claim 40, wherein said means for resolving an image comprises a frosted area on said plate.

42. The combination as in claim 44, wherein said frosted area is greater in length than the image focal plane of a camera in which said plate is used.

43. The combination as in claim 40, wherein the magazine has bearing means therein adjacent the film exit slot to reduce friction on the film strip as it is withdrawn from the magazine, and adhesive clearance channel means in the bearing means to prevent adherence of the adhesive means on the film strip to said bearing means.

44. The combination as in claim 40, wherein the magazine and plate are of one piece integral construction.

References Cited

UNITED STATES PATENTS

| | | | |
|---|---|---|---|
| 497,884 | 5/1893 | Krause et al. | 96—78 |
| 687,184 | 11/1901 | Albrecht | 96—78 |
| 1,184,404 | 5/1916 | Worthen | 95—31 R |
| 1,312,052 | 8/1919 | Sartorius | 96—78 |
| 1,378,208 | 5/1921 | Bailey | 95—49 |
| 1,532,785 | 4/1925 | Sulzer | 96—78 |
| 1,969,481 | 8/1934 | Slack | 96—78 |
| 2,019,672 | 11/1935 | Goodhand | 95—31 CA |
| 2,504,323 | 4/1950 | Gillespie | 95—42 X |
| 3,137,221 | 6/1964 | Watts | 95—31 R |
| 3,420,154 | 1/1969 | Lieser et al. | 95—31 R |
| 3,498,198 | 3/1970 | Fujii | 95—42 |

SAMUEL S. MATTHEWS, Primary Examiner

E. M. BERO, Assistant Examiner

U.S. Cl. X.R.

95—31 R, 34, 42, 49; 96—78